(12) United States Patent
Maloney et al.

(10) Patent No.: US 12,090,905 B2
(45) Date of Patent: Sep. 17, 2024

(54) VEHICLE SEATING ASSEMBLY WITH LOWER LEG SUPPORT

(71) Applicant: Ford Global Technologies, LLC, Dearborn, MI (US)

(72) Inventors: Patrick Maloney, Livonia, MI (US); Marcos Silva Kondrad, Macomb Township, MI (US); Kevin VanNieulande, Fraser, MI (US); Kevin Wayne Preuss, Berkley, MI (US); Joseph Michael Kish, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 283 days.

(21) Appl. No.: 17/876,815

(22) Filed: Jul. 29, 2022

(65) Prior Publication Data

US 2024/0034214 A1 Feb. 1, 2024

(51) Int. Cl.
*B60N 2/90* (2018.01)
*B60N 2/02* (2006.01)
*B60N 2/10* (2006.01)

(52) U.S. Cl.
CPC ......... *B60N 2/995* (2018.02); *B60N 2/02246* (2023.08); *B60N 2/10* (2013.01); *B60N 2/02253* (2023.08)

(58) Field of Classification Search
CPC ...... B60N 2/995; B60N 2/02246; B60N 2/10; B60N 2/02253
See application file for complete search history.

(56) References Cited

U.S. PATENT DOCUMENTS

| 8,827,938 | B2 * | 9/2014 | Fukuyama | A61H 1/00 601/102 |
| 9,284,055 | B2 | 3/2016 | Beroth et al. | |
| 10,479,225 | B2 * | 11/2019 | Dry | B60N 2/22 |
| 11,772,536 | B1 * | 10/2023 | Maloney | B60N 2/10 297/89 |
| 2002/0109385 | A1 * | 8/2002 | Marechal | B64D 11/0606 297/354.12 |
| 2021/0016688 | A1 * | 1/2021 | Neal | B60N 2/995 |
| 2021/0114493 | A1 * | 4/2021 | Huf | B60N 2/06 |
| 2021/0402903 | A1 | 12/2021 | Di Censo et al. | |

FOREIGN PATENT DOCUMENTS

| CN | 216331632 U | 4/2022 |
| EP | 3428005 B1 | 6/2021 |

* cited by examiner

*Primary Examiner* — Mark R Wendell
(74) *Attorney, Agent, or Firm* — Vichit Chea; Price Heneveld LLP

(57) ABSTRACT

A vehicle seating assembly includes a seat, a front leg, a seatback, and a lower leg support. The seat includes a forward end and a rearward end. The seat is configured to be coupled to a support surface. The front leg engages with the support surface. The seatback is rotatably coupled to the seat proximate the rearward end. The lower leg support is directly and rotatably coupled to the seat proximate the forward end. The lower leg support is movable between an extended position and a retracted position. The vehicle seating assembly is movable between a seated position and a reclined-and-raised position. Moving from the seated position toward the reclined-and-raised position includes increasing a first distance between the front leg and the support surface.

20 Claims, 12 Drawing Sheets

VEHICLE SEATING ASSEMBLY WITH LOWER LEG SUPPORT

FIELD OF THE DISCLOSURE

The present disclosure generally relates to a vehicle seating assembly. More specifically, the present disclosure relates to a vehicle seating assembly with a lower leg support.

BACKGROUND OF THE DISCLOSURE

Vehicles are often provided with one or more seating assemblies. Seating solutions provided within a passenger compartment of a vehicle can be a deciding factor in consumers purchase decisions.

SUMMARY OF THE DISCLOSURE

According to a first aspect of the present disclosure, a vehicle seating assembly includes a seat, a front leg, a seatback, and a lower leg support. The seat includes a forward end and a rearward end. The seat is configured to be coupled to a support surface. The front leg engages with the support surface. The seatback is rotatably coupled to the seat proximate the rearward end. The lower leg support is directly and rotatably coupled to the seat proximate the forward end. The lower leg support is movable between an extended position and a retracted position. The vehicle seating assembly is movable between a seated position and a reclined-and-raised position. Moving from the seated position toward the reclined-and-raised position includes increasing a first distance between the front leg and the support surface.

Embodiments of the first aspect of the disclosure can include any one or a combination of the following features:
- an actuator assembly that adjusts the vehicle seating assembly between the seated position and the reclined-and-raised position;
- the actuator assembly is directly coupled to the support surface;
- the actuator assembly includes a mounting bracket; a motor assembly, wherein the motor assembly includes a motor, a drive gear, and a driveshaft that is coupled to the motor and the drive gear; and a sector gear that engages with the drive gear, wherein movement of the drive gear by the motor induces movement of the sector gear, and wherein movement of the sector gear adjusts the vehicle seating assembly between the seated position and the reclined-and-raised position;
- the sector gear defines an aperture therein, wherein the aperture receives a protrusion, and wherein the aperture and the protrusion cooperate to limit motion of the sector gear;
- an anchor assembly that selectively retains the front leg to the support surface, wherein the anchor assembly is movable between an engaged position and a disengaged position;
- the reclined-and-raised position includes placing the anchor assembly in the disengaged position;
- moving from the seated position toward the reclined-and-raised position includes decreasing a second distance between an underside of the rearward end of the seat and the support surface;
- moving from the seated position toward the reclined-and-raised position includes moving the lower leg support toward the extended position;
- moving from the seated position toward the reclined-and-raised position includes reclining the seatback such that an angle between the seat and the seatback is increased;
- a rear leg, wherein the rear leg includes a first portion, a second portion, and an intermediate portion that extends between the first portion and the second portion, and wherein first portion is movable relative to the second portion;
- intermediate portion is rotatably coupled to the first portion;
- moving from the seated position toward the reclined-and-raised position includes adjusting an angle between the first portion and the second portion;
- the second portion of the rear leg is coupled to the support surface;
- the lower leg support includes a first member that is coupled to the seat; a second member that is movably coupled to the first member; and an actuator assembly that adjusts a position of the second member of the lower leg support relative to the first member of lower leg support, wherein the actuator assembly is positioned proximate the forward end of the seat; and
- the actuator assembly includes a mounting bracket that couples the actuator assembly to the seat; a motor assembly, wherein the motor assembly includes a motor, a drive gear, and a driveshaft that is coupled to the motor and the drive gear; and a sector gear that is defined by the second member of the lower leg support, wherein the sector gear engages with the drive gear, wherein movement of the drive gear by the motor induces movement of the second member of the lower leg support, and wherein movement of the second member adjusts the lower leg support between the retracted position and the extended position.

According to a second aspect of the present disclosure, a vehicle seating assembly includes a seat, a seatback, a front leg, an anchor assembly, and a lower leg support. The seat includes a forward end and a rearward end. The seat is configured to be coupled to a support surface. The front leg engages with the support surface. The anchor assembly selectively retains the front leg to the support surface. The anchor assembly is movable between an engaged position and a disengaged position. The seatback is rotatably coupled to the seat proximate the rearward end. The lower leg support is directly and rotatably coupled to the seat proximate the forward end. The lower leg support is movable between an extended position and a retracted position. The vehicle seating assembly is movable between a seated position and a reclined-and-raised position. The reclined-and-raised position includes placing the anchor assembly in the disengaged position. Moving from the seated position toward the reclined-and-raised position also includes increasing a first distance between the front leg and the support surface. Moving from the seated position toward the reclined-and-raised position further includes decreasing a second distance between an underside of the rearward end of the seat and the support surface. Moving from the seated position toward the reclined-and-raised position also includes moving the lower leg support toward the extended position. Moving from the seated position toward the reclined-and-raised position further includes reclining the seatback such that an angle between the seat and the seatback is increased.

Embodiments of the second aspect of the present disclosure can include any one or a combination of the following features:

an actuator assembly that adjusts the vehicle seating assembly between the seated position and the reclined-and-raised position, wherein the actuator assembly is directly coupled to the support surface, wherein the actuator assembly includes: a mounting bracket; a motor assembly, wherein the motor assembly includes a motor, a drive gear, and a driveshaft that is coupled to the motor and the drive gear; and a sector gear that engages with the drive gear, wherein movement of the drive gear by the motor induces movement of the sector gear, wherein movement of the sector gear adjusts the vehicle seating assembly between the seated position and the reclined-and-raised position, wherein the sector gear defines an aperture therein, wherein the aperture receives a protrusion, and wherein the aperture and the first protrusion cooperate to limit motion of the sector gear;

a rear leg, wherein the rear leg includes a first portion, a second portion, and an intermediate portion that extends between the first portion and the second portion, wherein first portion is movable relative to the second portion, wherein the intermediate portion is rotatably coupled to the first portion, wherein moving from the seated position toward the reclined-and-raised position includes adjusting an angle between the first portion and the second portion; and the lower leg support includes a first member that is coupled to the seat; a second member that is movably coupled to the first member; and an actuator assembly that adjusts a position of the second member of the lower leg support relative to the first member of the lower leg support, wherein the actuator assembly is positioned proximate the forward end of the seat, wherein the actuator assembly includes: a mounting bracket that couples the actuator assembly to the seat; a motor assembly, wherein the motor assembly includes a motor, a drive gear, and a driveshaft that is coupled to the motor and the drive gear; and a sector gear that is defined by the second member of the lower leg support, wherein the sector gear engages with the drive gear, wherein movement of the drive gear by the motor induces movement of the second member of the lower leg support, and wherein movement of the second member adjusts the lower leg support between the retracted position and the extended position.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
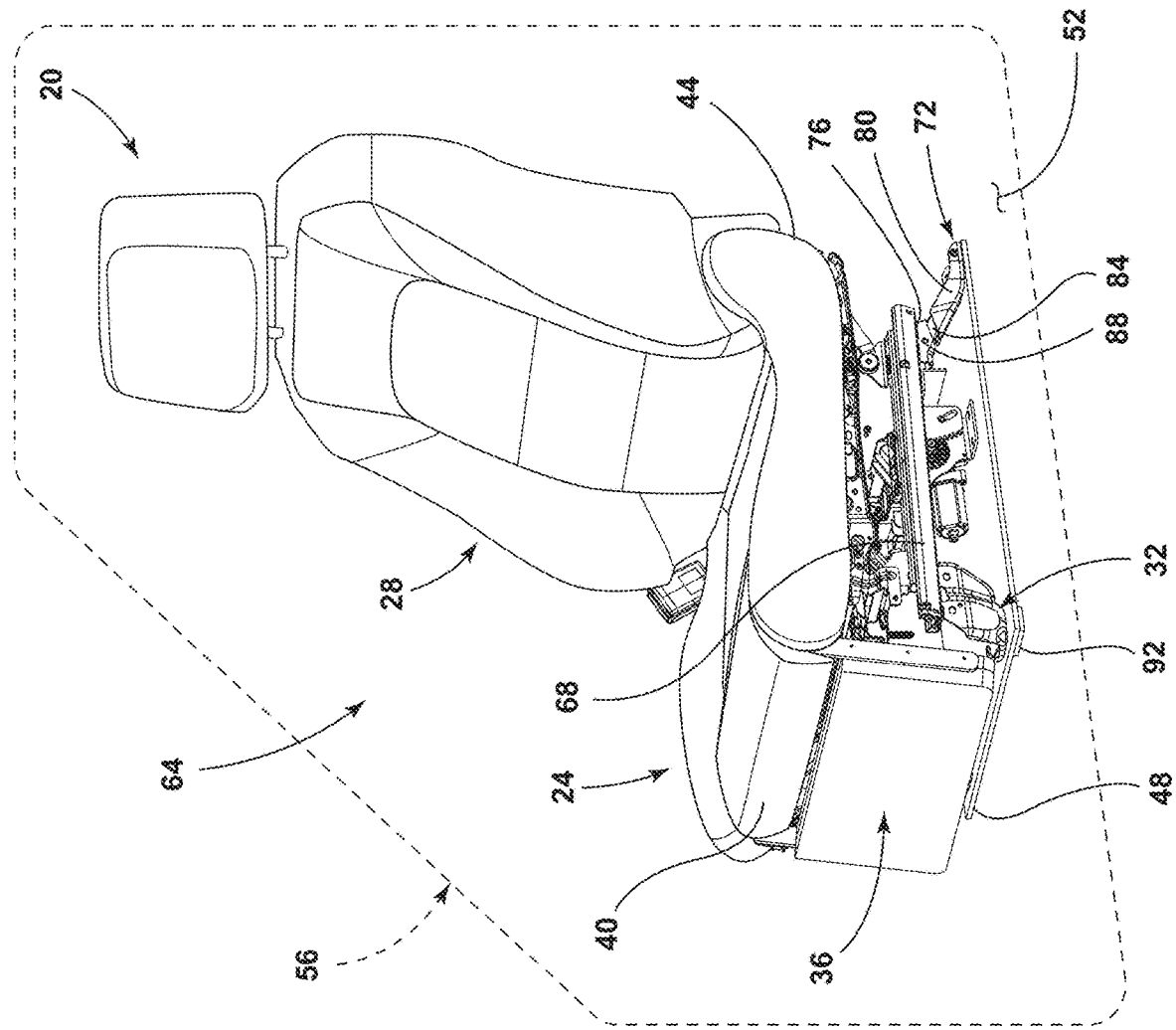
FIG. 1 is a side perspective view of a vehicle seating assembly, illustrating a seated position of the vehicle seating assembly, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone;

A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-12, reference numeral 20 generally designates a vehicle seating assembly 20. The vehicle seating assembly 20 includes a seat 24, a seatback 28, a front leg 32, and a lower leg support 36. The seat 24 includes a forward end 40 and a rearward end 44. The seat 24 is configured to be coupled to a support surface 48. In some examples, the support surface 48 may be a floor 52 of a vehicle 56. The front leg 32 engages with the support surface 48. For example, the front leg 32 may physically contact the support surface 48 (e.g., a top surface of the support surface 48). In some examples, the front leg 32 may be capable of being selectively retained to the support surface 48, as will be discussed in further detail herein. The seatback 28 is rotatably coupled to the seat 24 proximate the rearward end 44. The lower leg support 36 is directly and rotatably coupled to the seat 24 proximate the forward end 40. The lower leg support 36 is movable between a retracted position (e.g., FIGS. 1, 5, and 11) and an extended position (e.g., FIGS. 2, 9, and 12). The vehicle seating assembly 20 is movable between a seated position (e.g., FIG. 1) and a reclined-and-raised position (e.g., FIG. 2). Moving from the seated position toward the reclined-and-raised position includes increasing a first distance 60 between the front leg 32 and the support surface 48.

Referring again to FIGS. 1-12, the vehicle seating assembly 20 may be positioned within the vehicle 56. For example, the vehicle seating assembly 20 may be positioned within a passenger compartment 64 of the vehicle 56. The vehicle 56 may be a motor vehicle. For example, the vehicle 56 may be a land-based vehicle (e.g., an automobile, a motorcycle, a train, etc.), an air-based vehicle (e.g., an airplane, a helicopter, etc.), and/or a water-based vehicle (e.g., a boat or other watercraft). While the vehicle 56 may be a motor vehicle, the present disclosure is not limited to internal combustion engines as a source of locomotive power for the vehicle 56. Rather, alternative sources may be utilized in providing locomotive power to the vehicle 56. For example, locomotive power may be provided to the vehicle 56 by electric motors, fuel cells, and/or petroleum-based fuel engines. According to various examples, the vehicle 56 may be driver-controlled, semi-autonomous, fully-autonomous, or any combination of user-controlled and automated. For example, the semi-autonomous example of the vehicle 56 may perform many, or all, commuting functions (e.g., accelerating, braking, turning, signaling, etc.) independent of user interaction while the user maintains override control of the vehicle 56.

The reclined-and-raised position of the vehicle seating assembly 20 is intended for use when the vehicle 56 is in a stationary (i.e., non-moving) state. For example, while a transmission of the vehicle 56 is in a parked position. However, while all modern OEMs of passenger vehicles currently warn occupants against reclining the vehicle seating assembly 20 past a certain angle while the vehicle 56 is moving and/or riding in a fully reclined or supine position due to safety concerns, it is anticipated that technology and the regulatory framework may evolve in the future where such an activity is permissible.

Referring further to FIGS. 1-12, the vehicle seating assembly 20 may be provided with longitudinal adjustment rails 68 that are coupled to the seat 24, the front leg 32, and/or a rear leg 72. The longitudinal adjustment rails 68 may enable the seat 24 and the seatback 28 to be adjusted relative to the front leg 32, the rear leg 72, and/or the support surface 48 along a longitudinal axis of the vehicle seating assembly 20 (e.g., a fore-aft direction). In various examples, the rear leg 72 includes a first portion 76, a second portion 80, and an intermediate portion 84. The intermediate portion 84 extends between the first portion 76 and the second portion 80. In some examples, the first portion 76 is movable relative to the second portion 80. In various examples, the intermediate portion 84 can be rotatably coupled to the first portion 76. For example, the first portion 76 and the intermediate portion 84 may each define a coupling aperture 88 that is used to rotatably couple the first portion 76 and the intermediate portion 84. Accordingly, the coupling apertures 88 may define a rotational axis about which the first portion 76 of the rear leg 72 rotates when the vehicle seating assembly 22 is transitioned from the seated position toward the reclined-and-raised position. In some examples, the intermediate portion 84 may be fixedly coupled with the second portion 80 such that the first portion 76 of the rear leg 72 is the only portion of the rear leg 72 that moves as the vehicle seating assembly 20 is transitioned between the seated position and the reclined-and-raised position.

Figure 2:
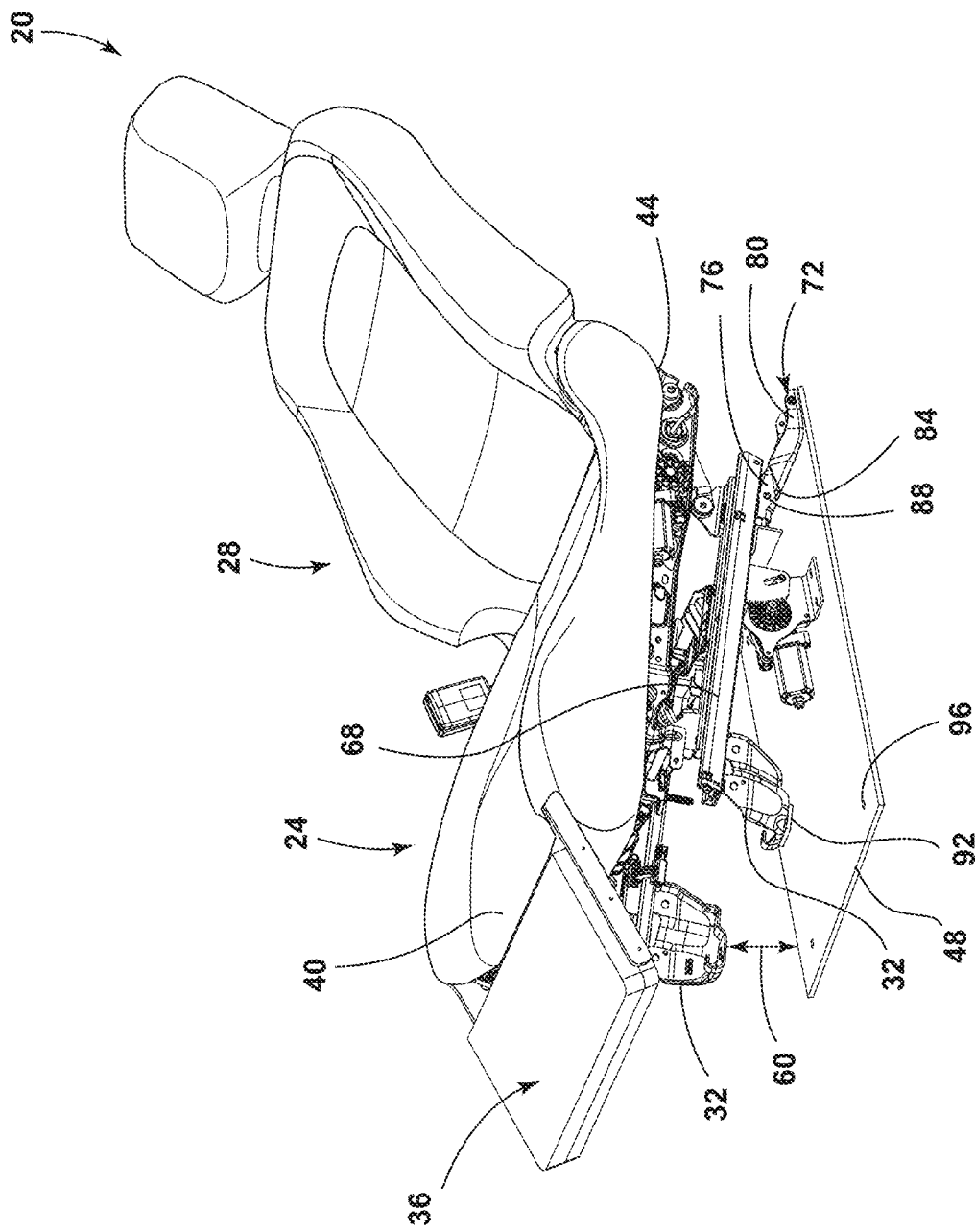
FIG. 2 is a side perspective view of the vehicle seating assembly, illustrating a reclined-and-raised position of the vehicle seating assembly, according to one example.

Referring still further to FIGS. 1-12, in various examples, a relative position of the front leg 32, the longitudinal adjustment rails 68, and the first portion 76 of the rear leg 72 may remain constant regardless of the positioning of the vehicle seating assembly 20 (e.g., throughout the adjustments between the seated position and the reclined-and-raised position). The vehicle seating assembly 20 may be provided with an anchor assembly 92 that selectively retains the front leg 32 to the support surface 48. The anchor assembly 92 may be arranged in a variety of ways without departing from the concepts disclosed herein. Two exemplary arrangements of the anchor assembly 92 are shown in FIGS. 1 and 2. More specifically, FIG. 1 depicts the anchor assembly 92 coupled to an underside of the support surface 48 such that the front leg 32 directly engages with a top side of the support surface 48. The example of FIG. 2 depicts the anchor assembly 92 coupled to an underside of the front leg 32 such that one or more of the front legs 32 may not directly engage with the top side of the support surface 48 when the vehicle seating assembly 20 is in the seated position. In either of the examples depicted in FIGS. 1 and 2, an anchor aperture 96 may be defined by the support surface 48. The anchor aperture 96 may be employed as an anchoring point for the anchor assembly 92 and/or the front leg 32 such that the anchor assembly 92 may be movable between an engaged position and a disengaged position relative to the front leg 32 and/or the support surface 48.

Figure 3:
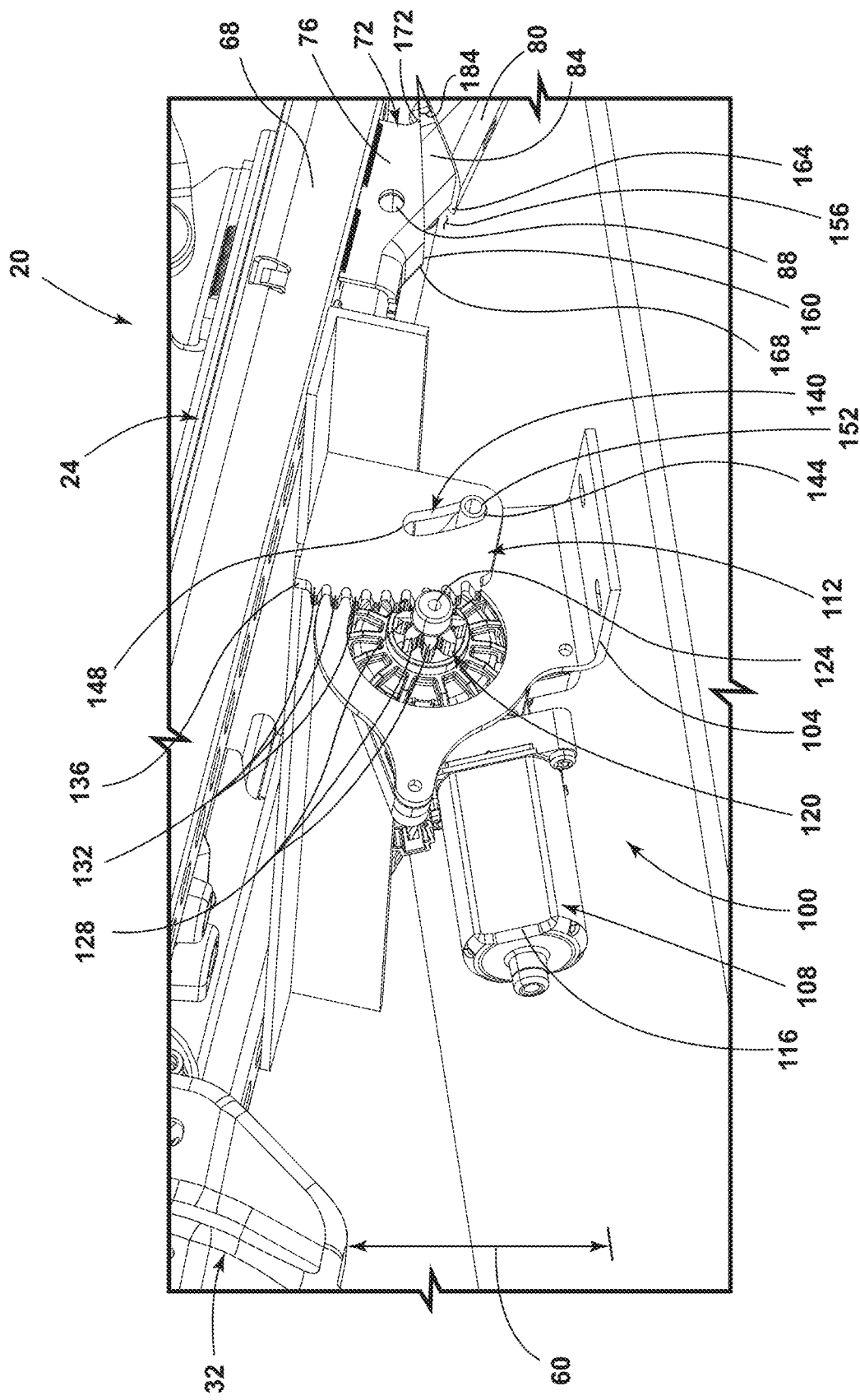
FIG. 3 is a side perspective view of an actuator assembly of the vehicle seating assembly, illustrating the reclined-and-raised position of the vehicle seating assembly, according to one example.
Figure 4:
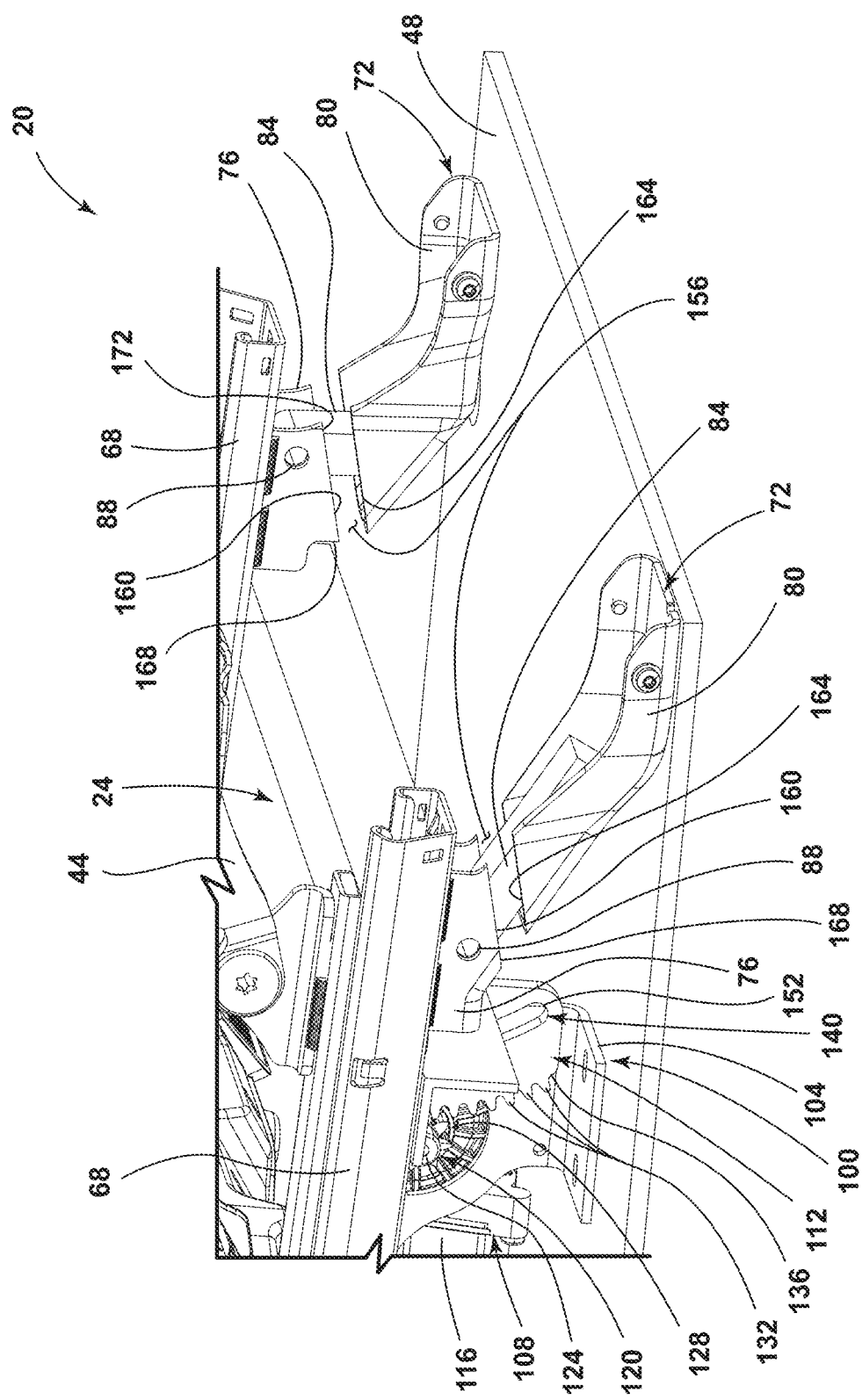
FIG. 4 is a rear perspective view of a rear leg of the vehicle seating assembly, illustrating the seated position of the vehicle seating assembly, according to one example.
Figure 5:
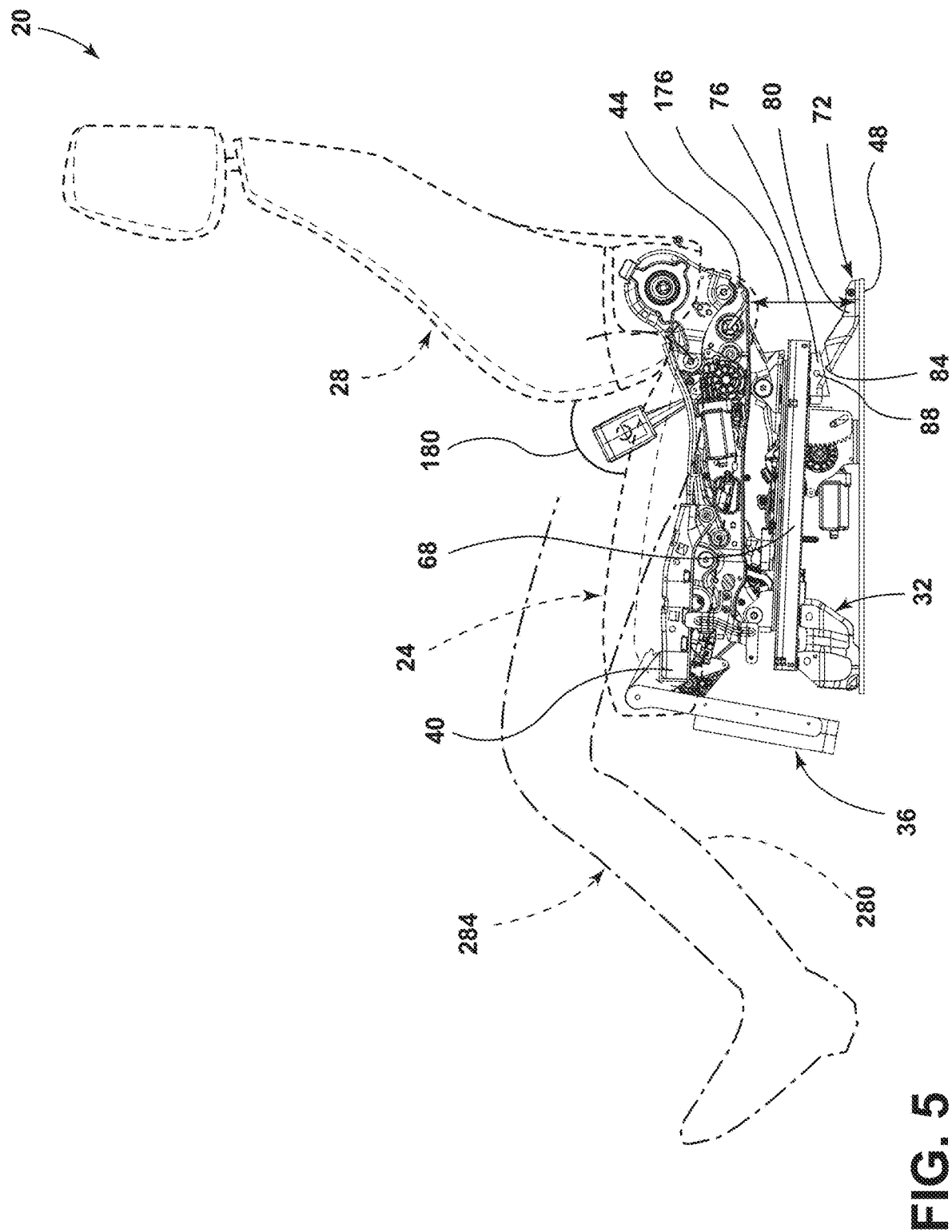
FIG. 5 is a side view of the vehicle seating assembly, illustrating the seated position, according to one example.
Figure 6:
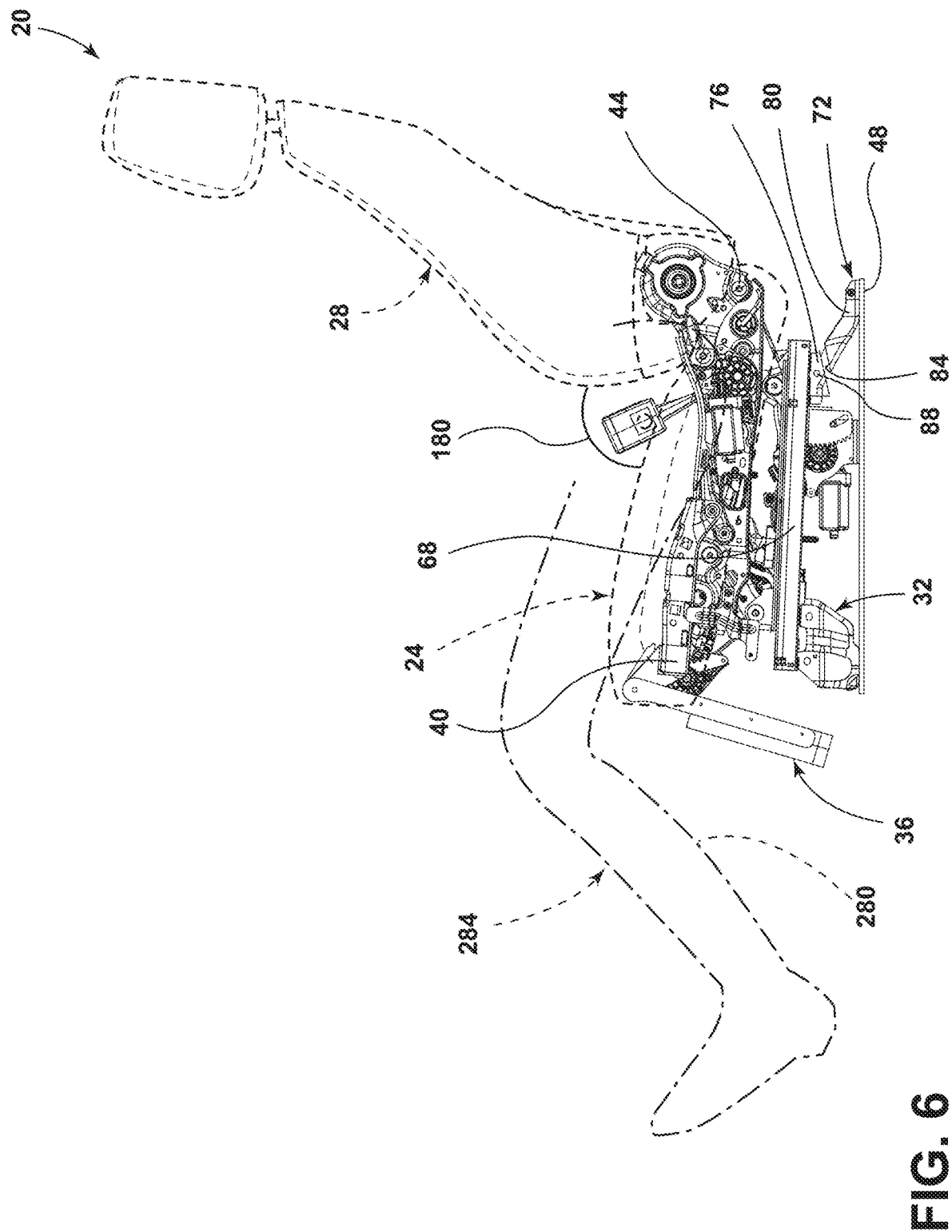
FIG. 6 is a side view of the vehicle seating assembly, illustrating a decrease in a distance between a rearward end of a seat and a support surface as the vehicle seating assembly moves toward the reclined-and-raised position, according to one example.
Figure 7:
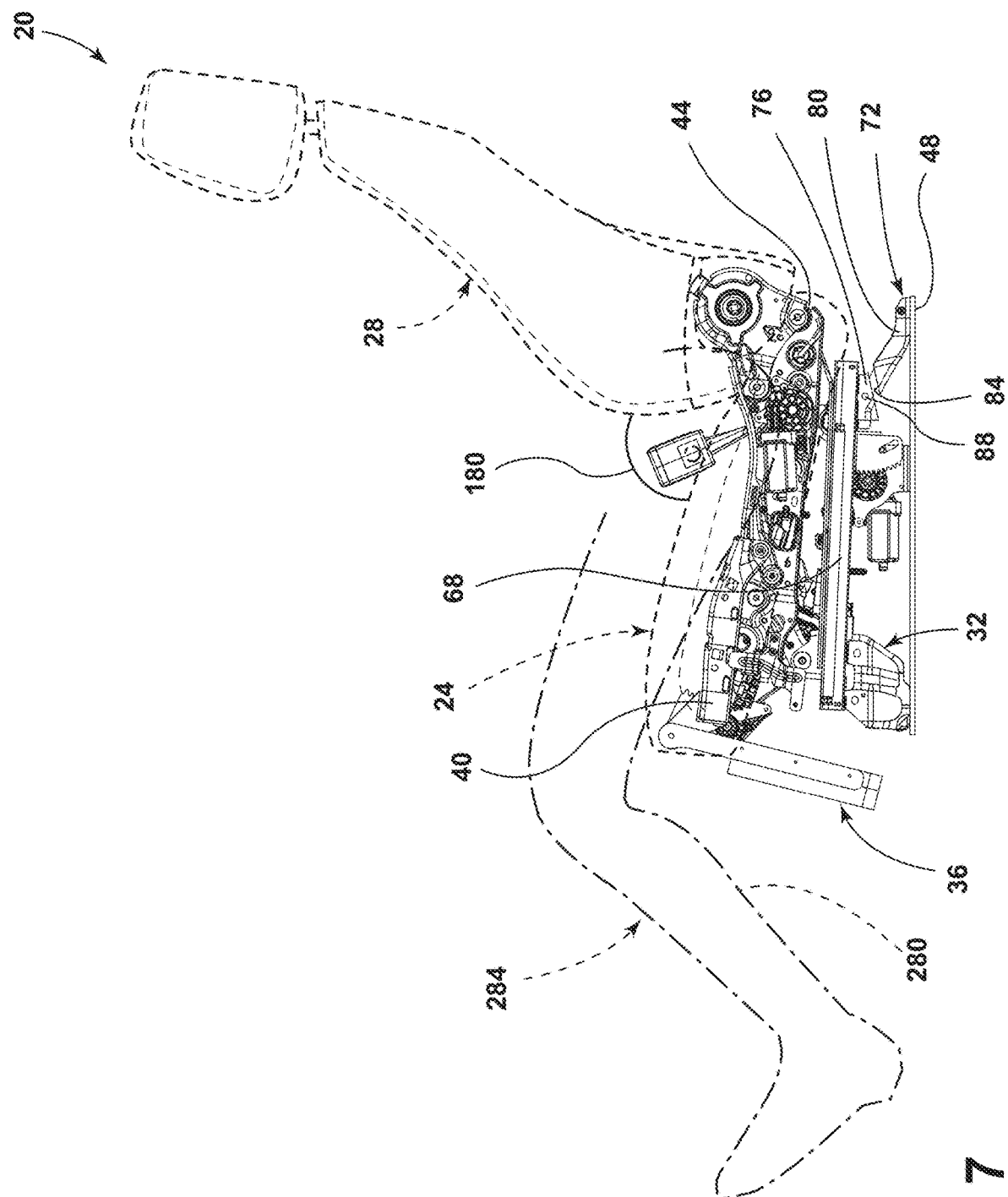
FIG. 7 is a side view of the vehicle seating assembly, illustrating a further decrease in the distance between the rearward end of the seat and the support surface as the vehicle seating assembly moves toward the reclined-and-raised position, according to one example.
Figure 8:
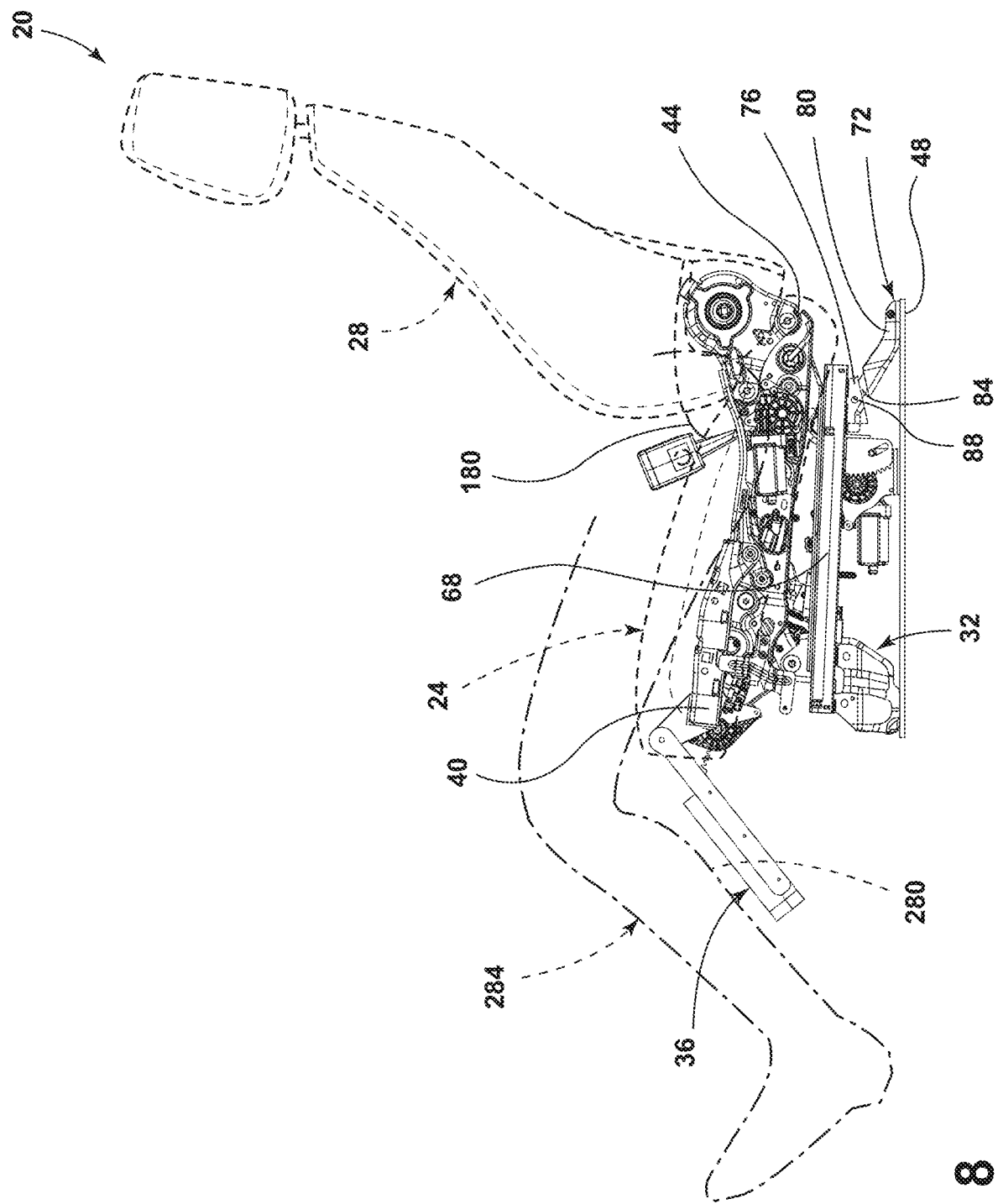
FIG. 8 is a side view of the vehicle seating assembly, illustrating a lower leg support transitioned toward an extended position, according to one example.
Figure 9:
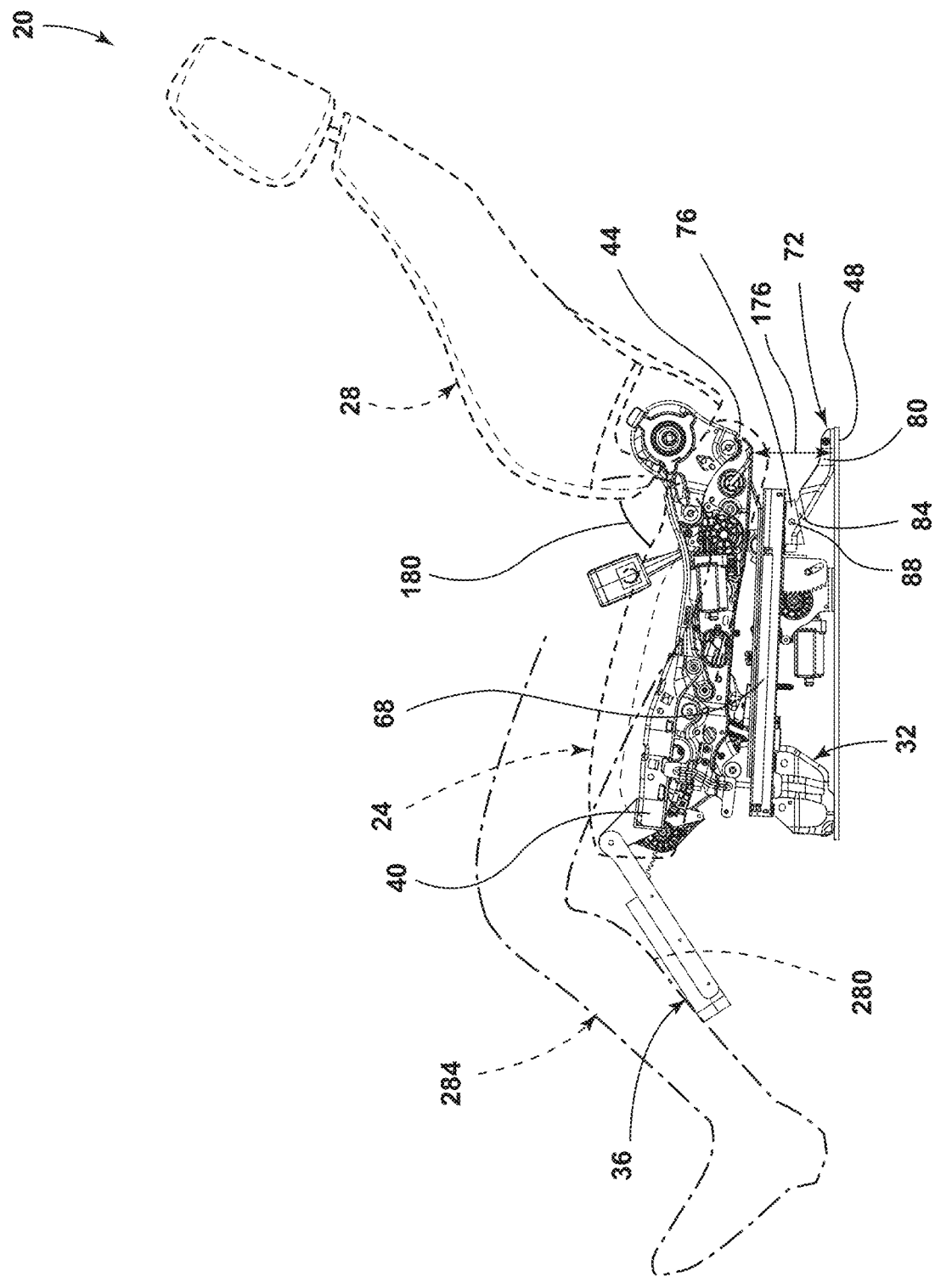
FIG. 9 is a side view of the vehicle seating assembly, illustrating an increase of an angle between the seat and a seatback as the vehicle seating assembly is transitioned toward the reclined-and-raised position, according to one example.
Figure 10:
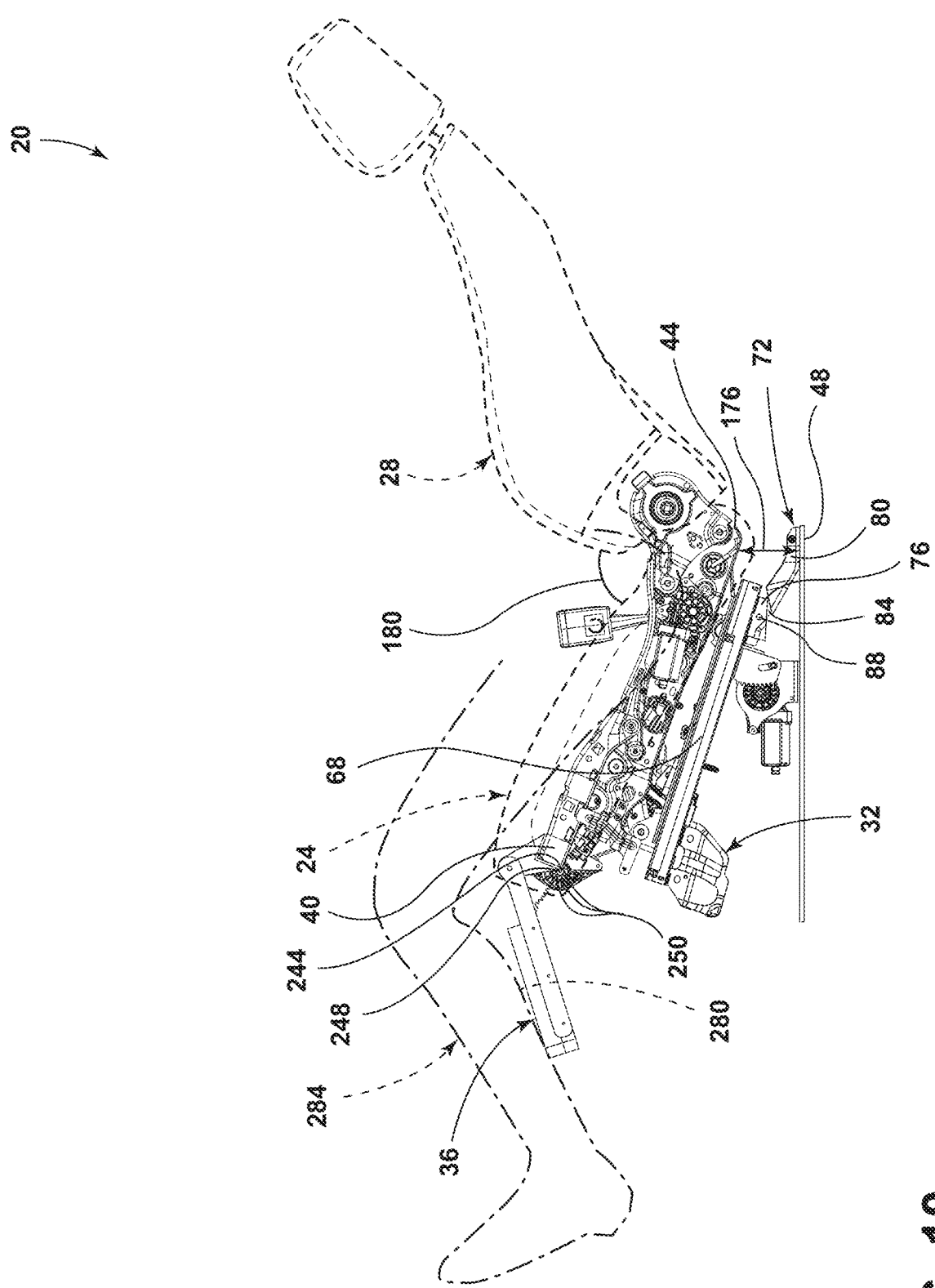
FIG. 10 is a side view of the vehicle seating assembly, illustrating an increase in a distance between a front leg and the support surface as the vehicle seating assembly is transitioned toward the reclined-and-raised position, according to one example.

Referring now to FIGS. 3 and 4, an actuator assembly, such as a first actuator assembly 100, may adjust the vehicle seating assembly 20 between the seated position and the reclined-and-raised position. In various examples, the first actuator assembly 100 can be directly coupled to the support surface 48. The first actuator assembly 100 includes a mounting bracket 104, a motor assembly 108, and a sector gear 112. The motor assembly 108 of the first actuator assembly 100 includes a motor 116, a drive gear 120, and a driveshaft 124. The driveshaft 124 is coupled to the motor 116 and the drive gear 120. The drive gear 120 defines teeth 128 that are positioned about a circumference of the drive gear 120. The teeth 128 of the drive gear 120 are configured to mesh with teeth 132 that are defined by an adjacent edge 136 of the sector gear 112. The adjacent edge 136 of the sector gear 112 may be generally arcuate in shape such that the teeth 132 defined by the adjacent edge 136 may not be arranged in a straight line, but may be better described as being arranged along an arc length of a circumference of a circle. Movement of the drive gear 120 by the motor 116 induces movement of the sector gear 112. Movement of the sector gear 112 may adjust the vehicle seating assembly 20 between the seated position and the reclined-and-raised position. In various examples, the sector gear 112 may define an aperture 140 therein. The aperture 140 defined by the sector gear 112 may receive a protrusion 144. The protrusion 144 may be coupled to the mounting bracket 104 of the first actuator assembly 100. The aperture 140 and the protrusion 144 can cooperate to limit motion of the sector gear 112. For example, an upper extreme 148 of the aperture 140 may correspond with the seated position of the vehicle seating assembly 20. In such an example, a lower extreme 152 of the aperture 140 may correspond with the reclined-and-raised position of the vehicle seating assembly 20.

As stated above, the reclined-and-raised position of the vehicle seating assembly 20 is intended for use when the vehicle 56 is in a stationary (i.e., non-moving) state. For example, while a transmission of the vehicle 56 is in a parked position. However, while all modern OEMs of passenger vehicles currently warn occupants against reclining the vehicle seating assembly 20 past a certain angle while the vehicle 56 is moving and/or riding in a fully reclined or supine position due to safety concerns, it is anticipated that technology and the regulatory framework may evolve in the future where such an activity is permissible.

Referring again to FIGS. 3 and 4, the second portion 80 of the rear leg 72 can be coupled to the support surface 48. For example, the second portion 80 of the rear leg 72 may be fixedly coupled to the support surface 48. In some examples, the second portion 80 of the rear leg 72 may be directly coupled to the support surface 48. In various examples, the first portion 76 and the second portion 80 may be provided with a space 156 therebetween to permit the rotational motion of the first portion 76 relative to the second portion 80 and/or the intermediate portion 84. In such an example, the intermediate portion 84 extends between the first portion 76 and the second portion 80 across the space 156. When the vehicle seating assembly 20 is in the seated position, a lower edge 160 of the first portion 76 and an upper edge 164 of the second portion 80 may be generally parallel to one another (see FIG. 4). When the vehicle seating assembly 20 is in the reclined-and-raised position (see FIG. 3), the lower edge 160 and the upper edge 164 may be in a non-parallel relationship. For example, as depicted in FIG. 3, the space 156 between the upper edge 164 and a front 168 of the lower edge 160 may be greater than the space 156 between the upper edge 164 and a rear 172 of the lower edge 160. In some examples, the upper extreme 148 and the lower extreme 152 of the aperture 140 may limit motion of the sector gear 112 in a manner that prevents the teeth 128 of the drive gear 120 from contacting the adjacent edge 136 in regions that are not provided with the teeth 132. Said another way, the aperture 140 of the sector gear 112 may be configured to prevent decoupling between the drive gear 120 and the sector gear 112 and/or prevent binding between the components of the first actuator assembly 100.

Referring to FIGS. 5-10, in transitioning the vehicle seating assembly 20 from the seated position toward the reclined-and-raised position, the anchor assembly 92 (see FIGS. 1 and 2) is placed in the disengaged position in examples that include the anchor assembly 92. Said another way, transitioning toward the reclined-and-raised position includes placing the anchor assembly 92 in the disengaged position. In various examples, moving the vehicle seating assembly 20 from the seated position toward the reclined-and-raised position can include decreasing a second distance 176 between the support surface 48 and an underside of the rearward end 44 of the seat 24. The decrease in the second distance 176 as the vehicle seating assembly 20 is transitioned from the seated position toward the reclined-and-raised position can be observed by viewing the progression from FIG. 5 to FIG. 7.

Referring again to FIGS. 5-10, in transitioning the vehicle seating assembly 20 from the seated position toward the reclined-and-raised position, the lower leg support 36 may be moved toward the extended position (see FIGS. 8-10). When moving from the seated position toward the reclined-and-raised position, an angle 180 between the seat 24 and the seatback 28 may be increased. As discussed above, moving the vehicle seating assembly 20 from the seated position toward the reclined-and-raised position can include adjusting the first portion 76 of the rear leg 72 relative to the second portion 80. For example, moving the vehicle seating assembly 20 from the seated position toward the reclined-and-raised position can include adjusting an angle 184 between the first portion 76 and the second portion 80 (see FIG. 3). In various examples, as the vehicle seating assembly 20 is transitioned from the seated position toward the reclined-and-raised position the seat 24, and the components positioned between the seat 24 and the longitudinal adjustment rails 68, may collectively be adjusted in their orientation or arrangement relative to the longitudinal adjustment rails 68. Said another way, an entirety of the components of the vehicle seating assembly 20 that are positioned above the longitudinal adjustment rails 68 may be adjusted in their angular orientation relative to the longitudinal adjustment rails 68 as the vehicle seating assembly 20 is transitioned from the seated position toward the reclined-and-raised position, as can be seen in the progression from FIG. 5 to FIG. 9.

As stated above, the reclined-and-raised position of the vehicle seating assembly 20 is intended for use when the vehicle 56 is in a stationary (i.e., non-moving) state. For example, while a transmission of the vehicle 56 is in a parked position. However, while all modern OEMs of passenger vehicles currently warn occupants against reclining the vehicle seating assembly 20 past a certain angle while the vehicle 56 is moving and/or riding in a fully reclined or supine position due to safety concerns, it is anticipated that technology and the regulatory framework may evolve in the future where such an activity is permissible.

Figure 11:
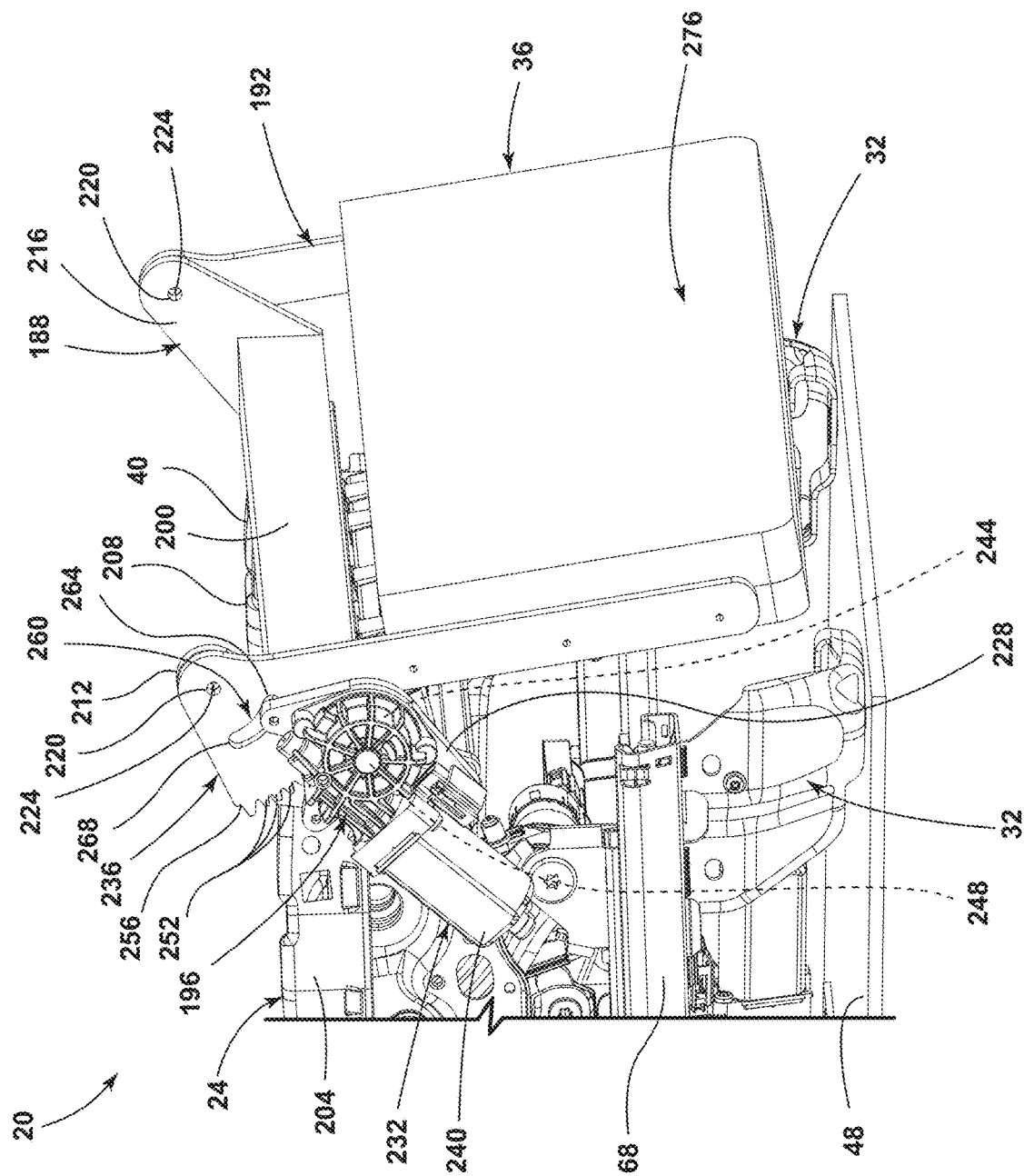
FIG. 11 is a front perspective view of the vehicle seating assembly, illustrating the lower leg support in a retracted position, according to one example.
Figure 12:
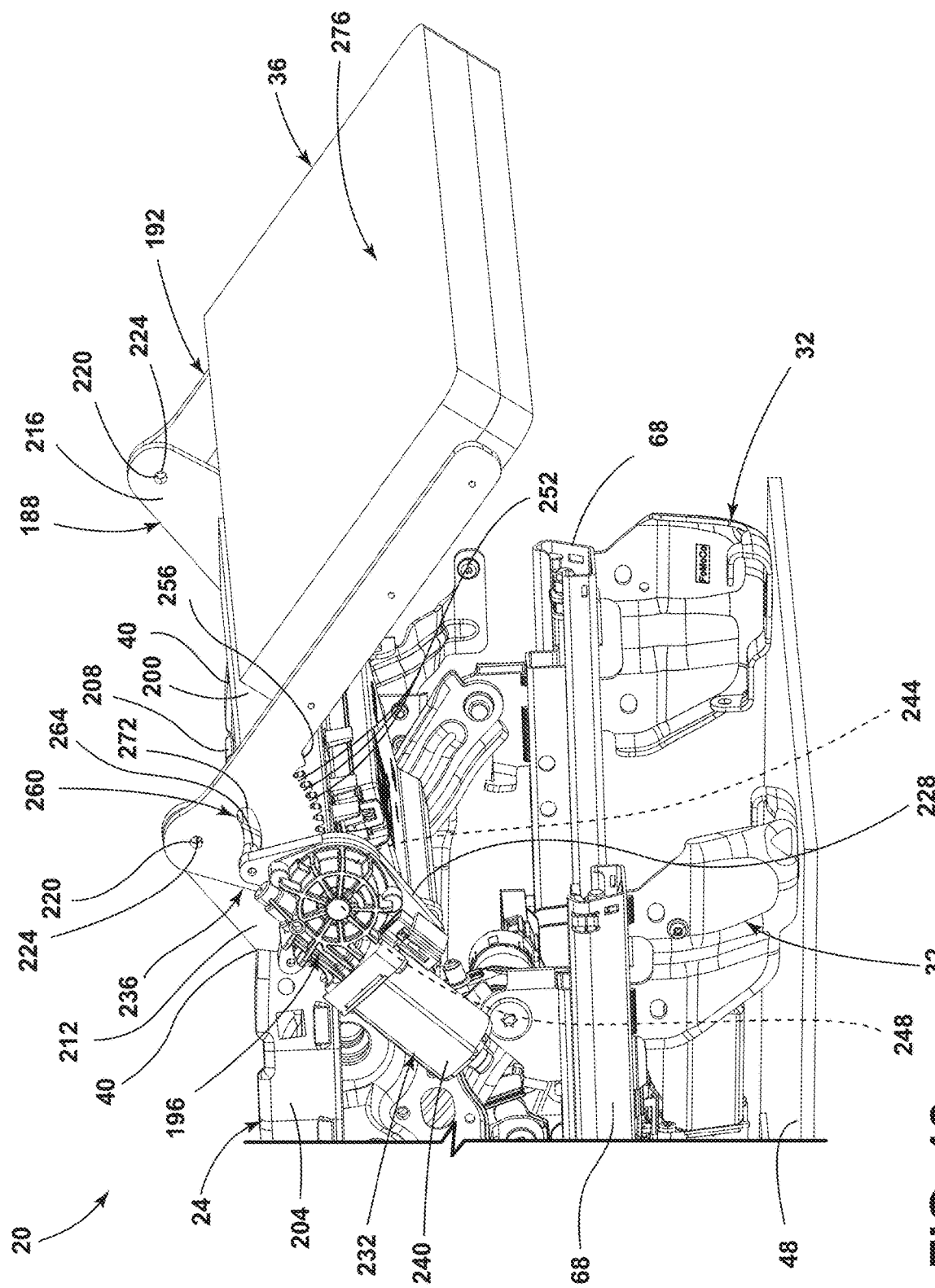
FIG. 12 is a front perspective view of the vehicle seating assembly, illustrating the lower leg support in the extended position, according to one example.

Referring now to FIGS. 11 and 12, the lower leg support 36 can include a first member 188, a second member 192, and an actuator assembly. The actuator assembly for the lower leg support 36 may be referred to as a second actuator assembly 196. The first member 188 is coupled to the seat 24. For example, the first member 188 may be directly coupled to the forward end 40 of the seat 24. The first member 188 can include a central region 200 that extends from a first side 204 of the seat 24 to a second side 208 of the seat 24. For example, a width of the central region 200 may generally correspond with a width of the seat 24, where the seat 24 has a width that extends from the first side 204 to the second side 208. The first member 188 can include a first flange 212 and a second flange 216. The first flange 212 may correspond with the first side 204 and the second flange 216 may correspond with the second side 208 such that the first and second flanges 212, 216 are positioned on opposing sides of the central region 200. The first flange 212 and the second flange 216 may each define a coupling hole 220 that is configured to align with corresponding fastener holes 224 that are defined by the second member 192 of the lower leg support 36. The coupling holes 220 and the fastener holes 224 may define a rotational axis of the lower leg support 36. More specifically, the coupling holes 220 and the fastener holes 224 may define a rotational axis of the second member 192 relative to the first member 188. In various examples, the first and second flanges 212, 216 may extend outwardly and/or upwardly away from the forward end 40 of the seat 24. The first flange 212 and the second flange 216 may maintain their orientation relative to the forward end 40 of the seat 24 regardless of a positioning of the vehicle seating assembly 20 relative to the seated position and the reclined-and-raised position. Similarly, the positioning of the first flange 212 and the second flange 216 may be independent of a rotational position of the second member 192 relative to the first member 188.

Referring again to FIGS. 11 and 12, the second member 192 of the lower leg support 36 is movably coupled to the first member 188. The second actuator assembly 196 can adjust a position of the second member 192 relative to the first member 188. In various examples, the second actuator assembly 196 may be positioned proximate the forward end 40 of the seat 24. The second actuator assembly 196 can include a mounting bracket 228, a motor assembly 232, and a sector gear 236. The mounting bracket 228 couples the second actuator assembly 196 to the seat 24. Similar to the first actuator assembly 100, the motor assembly 232 of the second actuator assembly 196 can include a motor 240, a drive gear 244, and a driveshaft 248. While the drive gear 244 and the driveshaft 248 are not directly depicted in FIGS. 11 and 12, the drive gear 244 and the driveshaft 248 can be seen from a distance in FIGS. 5-10. The drive gear 244 and the driveshaft 248 may have the same general arrangement, and may have the same general structure, as the drive gear 120 and the driveshaft 124 of the motor assembly 108 depicted in FIG. 3.

Referring further to FIGS. 11 and 12, the driveshaft 248 is coupled to the motor 240 and the drive gear 244. As with the drive gear 120, the drive gear 244 can define teeth 250 (see FIG. 10) that are positioned about a circumference of the drive gear 244. The teeth 250 of the drive gear 244 are configured to mesh with teeth 252 that are defined by an adjacent edge 256 of the sector gear 236. The adjacent edge 256 of the sector gear 236 may be generally arcuate in shape such that the teeth 252 defined by the adjacent edge 256 may not be arranged in a straight line, but may be better described as being arranged along an arc length of a circumference of a circle. Movement of the drive gear 244 by the motor 240 may induce movement of the sector gear 236. The movement of the sector gear 236 can induce movement of the second member 192 of the lower leg support 36. In the depicted example, the sector gear 236 is incorporated with the second member 192 such that movement of the sector gear 236 cannot be decoupled from movement of the second member 192. For example, the sector gear 236 may be unitarily formed with the second member 192.

Referring still further to FIGS. 11 and 12, movement of the second member 192 can adjust the lower leg support 36 between the retracted position (FIG. 11) and the extended position (FIG. 12). In various examples, the sector gear 236 may define an aperture 260 therein. The aperture 260 defined by the sector gear 236 may receive a protrusion 264. The protrusion 264 may be coupled to the mounting bracket 228 of the second actuator assembly 196. The aperture 260 and the protrusion 264 can cooperate to limit motion of the sector gear 236. For example, an upper extreme 268 of the aperture 260 may correspond with the extended position of the lower leg support 36. In such an example, a lower extreme 272 of the aperture 260 may correspond with the retracted position of the lower leg support 36. In some examples, the upper extreme 268 and the lower extreme 272 of the aperture 260 may limit motion of the sector gear 236 in a manner that prevents the teeth of the drive gear 244 from contacting the adjacent edge 256 in regions that are not provided with the teeth 252. Said another way, the aperture 260 of the sector gear 236 may be configured to prevent decoupling between the drive gear 244 and the sector gear 236 and/or prevent binding between the components of the second actuator assembly 196. The lower leg support 36 can include a cushion assembly 276 that is coupled to the second member 192. The cushion assembly 276 can be configured to engage with a lower leg region 280 of a user 284 (see FIGS. 5-10). For example, the lower leg region 280 may be a calf region of the user 284.

As stated above, the reclined-and-raised position of the vehicle seating assembly 20 is intended for use when the vehicle 56 is in a stationary (i.e., non-moving) state. For example, while a transmission of the vehicle 56 is in a parked position. However, while all modern OEMs of passenger vehicles currently warn occupants against reclining the vehicle seating assembly 20 past a certain angle while the vehicle 56 is moving and/or riding in a fully reclined or supine position due to safety concerns, it is anticipated that technology and the regulatory framework may evolve in the future where such an activity is permissible.

Vehicle seating assemblies are typically designed to meet a number of specifications that are dictated by their use within a passenger compartment of a vehicle. These specifications include, but are not limited to, spatial considerations within the passenger compartment, packaging of user-desired feature(s), and balancing user experience for a plurality of users within the passenger compartment (e.g., leg room). The reclined-and-raised position of the vehicle seating assembly 20 of the present disclosure may decrease a number of pressure points and/or an intensity of pressure points for the user 284 seated in the vehicle seating assembly 20 while providing a more ergonomically comfortable arrangement than a conventional reclined position where the seatback 28 may be moved relative to the seat 24 and the support surface 48 in an isolated manner. The reclined-and-raised position of the vehicle seating assembly 20 of the present disclosure may place the seatback 28 in a reclined position relative to the support surface 48 and/or the seat 24. Additionally, the reclined-and-raised position of the vehicle seating assembly 20 of the present disclosure can place the forward end 40 of the seat 24, the lower leg support 36, the front leg 32, the first portion 76 of the rear leg 72, and/or the anchor assembly 92 in a raised position relative to the support surface 34 when compared to the seated position.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle seating assembly, comprising:
    a seat having a forward end and a rearward end, wherein the seat is configured to be coupled to a support surface;
    a front leg that engages with the support surface;
    a seatback rotatably coupled to the seat proximate the rearward end; and
    a lower leg support directly and rotatably coupled to the seat proximate the forward end, wherein the lower leg support is movable between an extended position and a retracted position, wherein the vehicle seating assembly is movable between a seated position and a reclined-and-raised position, and wherein moving from the seated position toward the reclined-and-raised position includes increasing a first distance between the front leg and the support surface.

2. The vehicle seating assembly of claim 1, further comprising:
    an actuator assembly that adjusts the vehicle seating assembly between the seated position and the reclined-and-raised position.

3. The vehicle seating assembly of claim 2, wherein the actuator assembly is directly coupled to the support surface.

4. The vehicle seating assembly of claim 2, wherein the actuator assembly comprises:
    a mounting bracket;
    a motor assembly, wherein the motor assembly comprises a motor, a drive gear, and a driveshaft that is coupled to the motor and the drive gear; and
    a sector gear that engages with the drive gear, wherein movement of the drive gear by the motor induces movement of the sector gear, and wherein movement of the sector gear adjusts the vehicle seating assembly between the seated position and the reclined-and-raised position.

5. The vehicle seating assembly of claim 4, wherein the sector gear defines an aperture therein, wherein the aperture receives a protrusion, and wherein the aperture and the protrusion cooperate to limit motion of the sector gear.

6. The vehicle seating assembly of claim 1, further comprising:
an anchor assembly that selectively retains the front leg to the support surface, wherein the anchor assembly is movable between an engaged position and a disengaged position.

7. The vehicle seating assembly of claim 6, wherein the reclined-and-raised position includes placing the anchor assembly in the disengaged position.

8. The vehicle seating assembly of claim 1, wherein moving from the seated position toward the reclined-and-raised position includes decreasing a second distance between an underside of the rearward end of the seat and the support surface.

9. The vehicle seating assembly of claim 8, wherein moving from the seated position toward the reclined-and-raised position includes moving the lower leg support toward the extended position.

10. The vehicle seating assembly of claim 9, wherein moving from the seated position toward the reclined-and-raised position includes reclining the seatback such that an angle between the seat and the seatback is increased.

11. The vehicle seating assembly of claim 1, further comprising:
a rear leg, wherein the rear leg comprises a first portion, a second portion, and an intermediate portion that extends between the first portion and the second portion, and wherein the first portion is movable relative to the second portion.

12. The vehicle seating assembly of claim 11, wherein the intermediate portion is rotatably coupled to the first portion.

13. The vehicle seating assembly of claim 12, wherein moving from the seated position toward the reclined-and-raised position includes adjusting an angle between the first portion and the second portion.

14. The vehicle seating assembly of claim 13, wherein the second portion of the rear leg is coupled to the support surface.

15. The vehicle seating assembly of claim 1, wherein the lower leg support comprises:
a first member that is coupled to the seat;
a second member that is movably coupled to the first member; and
an actuator assembly that adjusts a position of the second member of the lower leg support relative to the first member of lower leg support, wherein the actuator assembly is positioned proximate the forward end of the seat.

16. The vehicle seating assembly of claim 15, wherein the actuator assembly comprises:
a mounting bracket that couples the actuator assembly to the seat;
a motor assembly, wherein the motor assembly comprises a motor, a drive gear, and a driveshaft that is coupled to the motor and the drive gear; and
a sector gear that is defined by the second member of the lower leg support, wherein the sector gear engages with the drive gear, wherein movement of the drive gear by the motor induces movement of the second member of the lower leg support, and wherein movement of the second member adjusts the lower leg support between the retracted position and the extended position.

17. A vehicle seating assembly, comprising:
a seat having a forward end and a rearward end, wherein the seat is configured to be coupled to a support surface;
a front leg that engages with the support surface;
an anchor assembly that selectively retains the front leg to the support surface, wherein the anchor assembly is movable between an engaged position and a disengaged position;
a seatback rotatably coupled to the seat proximate the rearward end; and
a lower leg support directly and rotatably coupled to the seat proximate the forward end, wherein the lower leg support is movable between an extended position and a retracted position, wherein the vehicle seating assembly is movable between a seated position and a reclined-and-raised position, wherein the reclined-and-raised position includes placing the anchor assembly in the disengaged position, wherein moving from the seated position toward the reclined-and-raised position includes increasing a first distance between the front leg and the support surface, wherein moving from the seated position toward the reclined-and-raised position includes decreasing a second distance between an underside of the rearward end of the seat and the support surface, wherein moving from the seated position toward the reclined-and-raised position includes moving the lower leg support toward the extended position, wherein moving from the seated position toward the reclined-and-raised position includes reclining the seatback such that an angle between the seat and the seatback is increased.

18. The vehicle seating assembly of claim 17, further comprising:
an actuator assembly that adjusts the vehicle seating assembly between the seated position and the reclined-and-raised position, wherein the actuator assembly is directly coupled to the support surface, wherein the actuator assembly comprises:
a mounting bracket;
a motor assembly, wherein the motor assembly comprises a motor, a drive gear, and a driveshaft that is coupled to the motor and the drive gear; and
a sector gear that engages with the drive gear, wherein movement of the drive gear by the motor induces movement of the sector gear, wherein movement of the sector gear adjusts the vehicle seating assembly between the seated position and the reclined-and-raised position, wherein the sector gear defines a aperture therein, wherein the aperture receives a protrusion, and wherein the aperture and the first protrusion cooperate to limit motion of the sector gear.

19. The vehicle seating assembly of claim 17, further comprising:
a rear leg, wherein the rear leg comprises a first portion, a second portion, and an intermediate portion that extends between the first portion and the second portion, wherein first portion is movable relative to the second portion, wherein the intermediate portion is rotatably coupled to the first portion, wherein moving from the seated position toward the reclined-and-raised position includes adjusting an angle between the first portion and the second portion.

20. The vehicle seating assembly of claim 17, wherein the lower leg support comprises:
a first member that is coupled to the seat;
a second member that is movably coupled to the first member; and an actuator assembly that adjusts a position of the second member of the lower leg support relative to the first member of lower leg support, wherein the actuator assembly is positioned proximate the forward end of the seat, wherein the actuator assembly comprises:
a mounting bracket that couples the actuator assembly to the seat;
a motor assembly, wherein the motor assembly comprises a motor, a drive gear, and a driveshaft that is coupled to the motor and the drive gear; and
a sector gear that is defined by the second member of the lower leg support, wherein the sector gear engages with the drive gear, wherein movement of the drive gear by the motor induces movement of the second member of the lower leg support, and wherein movement of the second member adjusts the lower leg support between the retracted position and the extended position.

\* \* \* \* \*